United States Patent
Oravits

(10) Patent No.: US 9,132,579 B2
(45) Date of Patent: Sep. 15, 2015

(54) EXTRUDER FEED THROAT HAVING HARDENED TILES ON INTERNAL SURFACES

(71) Applicant: Davis-Standard LLC, Pawcatuck, CT (US)

(72) Inventor: Thomas J. Oravits, Durham, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 17 days.

(21) Appl. No.: 14/070,924

(22) Filed: Nov. 4, 2013

(65) Prior Publication Data

US 2014/0127343 A1    May 8, 2014

Related U.S. Application Data

(60) Provisional application No. 61/721,577, filed on Nov. 2, 2012.

(51) Int. Cl.
*B29C 47/10*   (2006.01)
*B29C 47/08*   (2006.01)

(52) U.S. Cl.
CPC ........... *B29C 47/0849* (2013.01); *B29C 47/083* (2013.01); *B29C 47/10* (2013.01)

(58) Field of Classification Search
CPC .... B29C 47/083; B29C 47/0849; B29C 47/10
USPC ............... 425/205, 376.1, 461; 366/76.7
See application file for complete search history.

(56) References Cited

U.S. PATENT DOCUMENTS

| | | | | |
|---|---|---|---|---|
| 3,910,316 A | * | 10/1975 | Reifenhauser | 138/171 |
| 4,411,531 A | * | 10/1983 | Holmes et al. | 366/76.7 |
| 5,628,466 A | * | 5/1997 | Haack et al. | 241/82.6 |
| 7,513,676 B2 | * | 4/2009 | Williams et al. | 366/79 |
| 2009/0098234 A1 | * | 4/2009 | Graetz et al. | 425/209 |

* cited by examiner

*Primary Examiner* — Yogendra Gupta
*Assistant Examiner* — Joseph Leyson
(74) *Attorney, Agent, or Firm* — MKG, LLC

(57) ABSTRACT

A feed throat for an extruder device includes a body having an inlet defined by a longitudinal opening along a side of the body and an outlet positioned at an end of the body. The body has a substantially cylindrical interior surface which has a plurality of raised surfaces which extend radially inward from and longitudinally along the interior surface. One or more hardened tiles are secured to one or more of the raised surfaces.

10 Claims, 10 Drawing Sheets

US 9,132,579 B2

EXTRUDER FEED THROAT HAVING HARDENED TILES ON INTERNAL SURFACES

CROSS-REFERENCE TO RELATED APPLICATION

The present application claims the benefit under 35 U.S.C. §119 (e) of the Provisional Patent Application Ser. No. 61/721,577 filed Nov. 2, 2012, the disclosure of which is incorporated herein by reference in its entirety.

FIELD OF THE INVENTION

The present invention relates to the field of extruders and more particularly to an extruder feed throat which has hardened tiles disposed on portions of internal surfaces of the feed throat.

BACKGROUND OF THE INVENTION

Extrusion devices are used to melt, blend, and form materials, such as plastics, into a desired shape. Typical extrusion devices include a rotating screw housed coaxially within a heated, cylindrically-shaped feed throat and barrel. A portion of the feed throat is cut away forming an opening for admission of materials. A hopper is coupled to the extrusion device for feeding the material through the opening, into the feed throat and subsequently into the barrel. The screw rotates within the feed throat and barrel and drives the material therethrough. The extrusion material is forced through a die or aperture at a discharge end of the barrel.

Rotation of the screw within the feed throat typically involves a predetermined small gap between exterior portions of the screw and interior surfaces of the feed throat. The gap is sized to force the material to travel along the screw into the barrel. The interior surface can wear and cause the gap to become excessive. As a result, an unacceptable amount of material becomes stagnated in the feed throat.

SUMMARY OF THE INVENTION

According to aspects illustrated herein, there is provided a feed throat for an extruder device. The feed throat includes a body having an inlet defined by a longitudinal opening along a side of the body and an outlet positioned at an end of the body. The body has a substantially cylindrical interior surface which has a plurality of raised surfaces which extend radially inward from and longitudinally along the interior surface. One or more hardened tiles are secured to one or more of the raised surfaces.

According to another aspect illustrated herein, there is provided an extruder device which includes a drive section and an extrusion section, with a feed section disposed therebetween. The feed section has a feed throat which includes a body having an inlet defined by a longitudinal opening along a side of the body and an outlet positioned at an end of the body. The body has a substantially cylindrical interior surface which has a plurality of raised surfaces extending radially inward from and longitudinally along the interior surface. One or more hardened tiles are secured to at least one of the raised surfaces. A feed hopper and a ram stuffer are coupled to the feed throat and are in communication with the inlet. A screw is supported by the drive section and/or the extrusion section. The screw extends through the feed throat. The screw is spaced apart from the hardened tiles such that feed particles fed through the feed throat are prevented from rotating with the screw and so that forward displacement of the feed particles out of the feed throat and into the extrusion section is promoted.

DETAILED DESCRIPTION OF THE INVENTION

Figure 1:
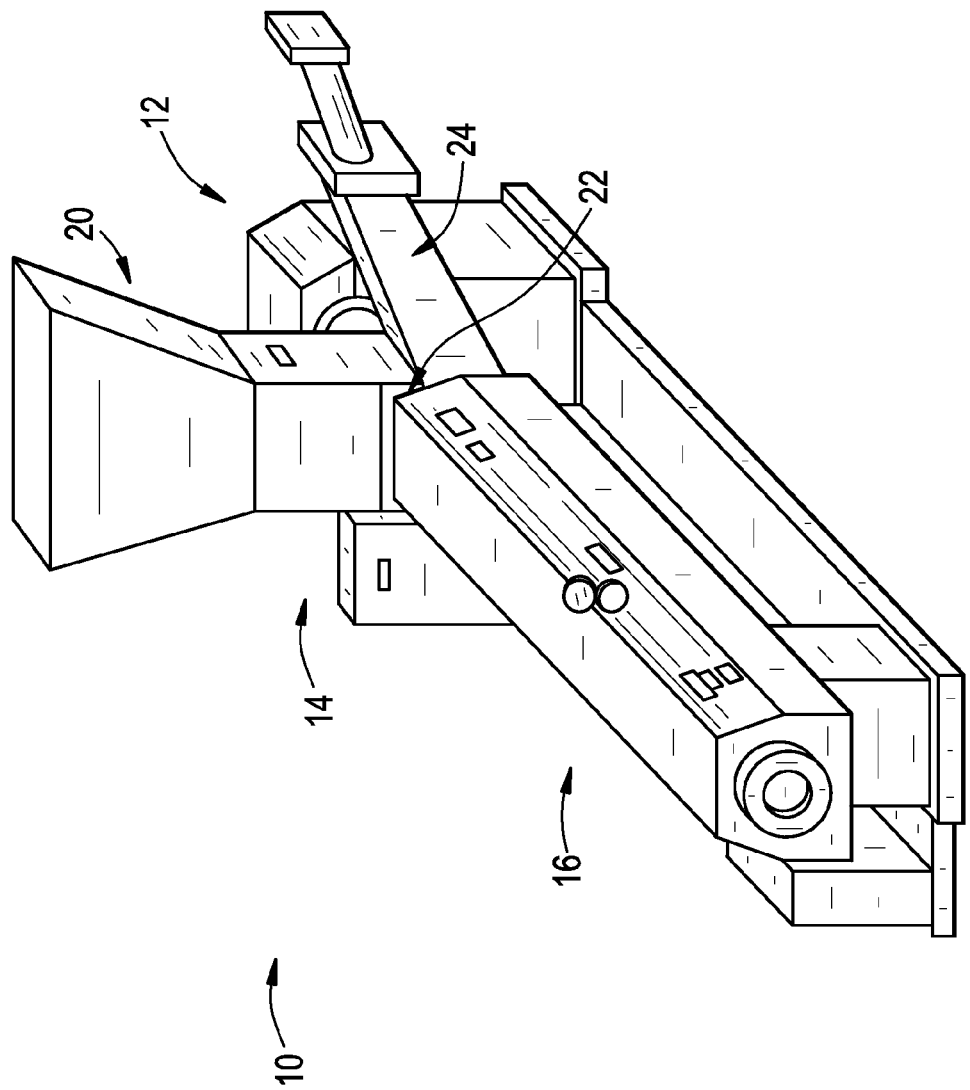
FIG. 1 is a perspective view of a single barrel extruder device.
Figure 2:
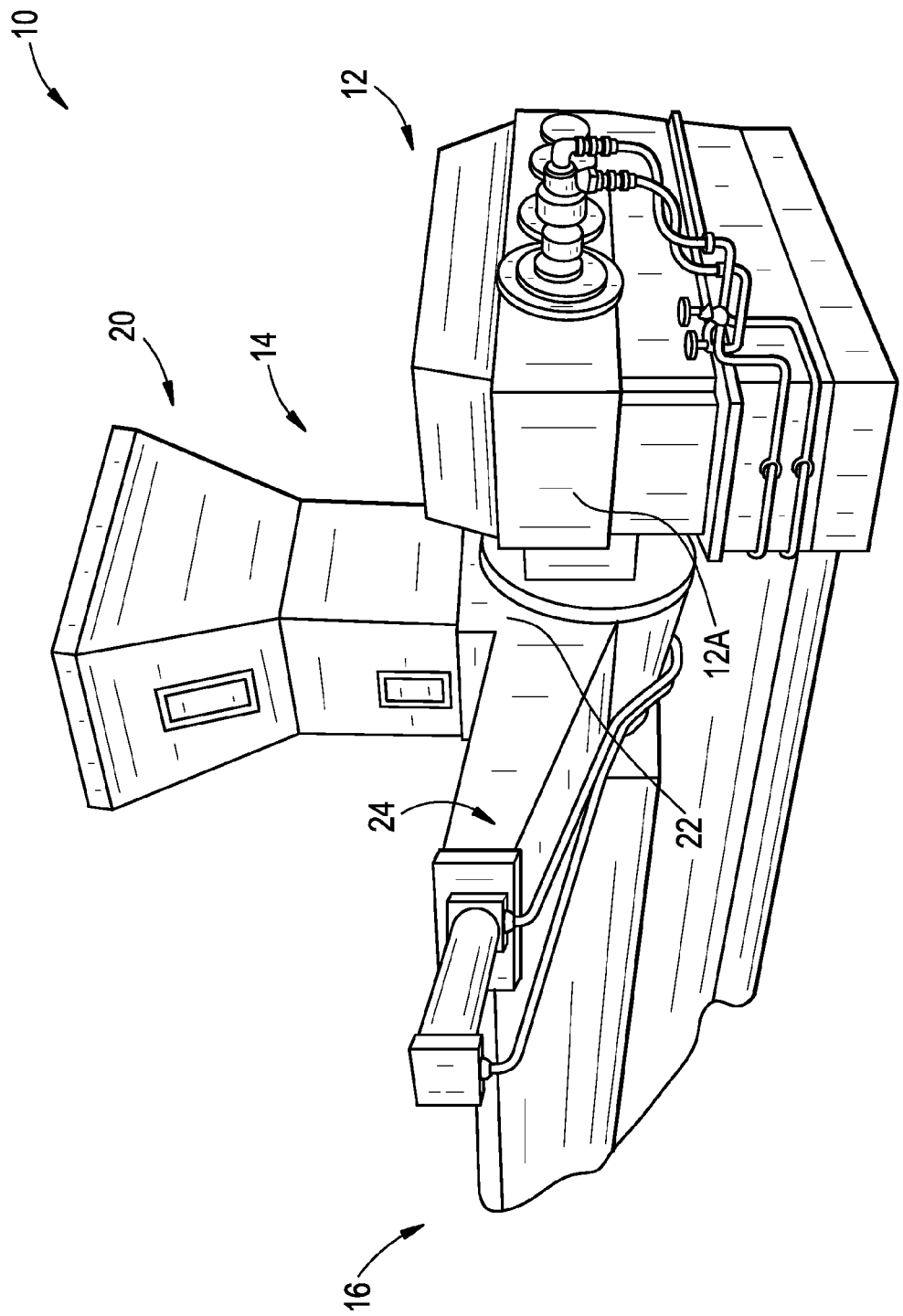
FIG. 2 is an enlarged perspective view of a portion of the extruder device of FIG. 1.

In reference to FIGS. 1 and 2, an extruder device 10 is generally designated by the numeral 10. The extruder device 10 includes a drive section 12, a feed section 14 and an extrusion section 16 with the feed section 14 disposed between the drive section 12 and the extrusion section 16. A screw 18 as shown in cross section view of FIG. 3, has one end supported by and connected to a drive shaft (not shown) disposed within the drive section 12 shown in FIGS. 1 and 2. The screw 18 is a deep flighted feed screw having channels 18A defined between threads 18T of the screw. The drive section 12 includes a gear box 12A that is driven by a suitable driver (not shown) (e.g., a hydraulic drive system or a motor) that rotates gears (not shown) in the gear box 12A, the shaft and the screw 18. The screw 18 is also supported in the extrusion section 16 by a suitable bearing (not shown) such as a journal bearing.

Figure 3:
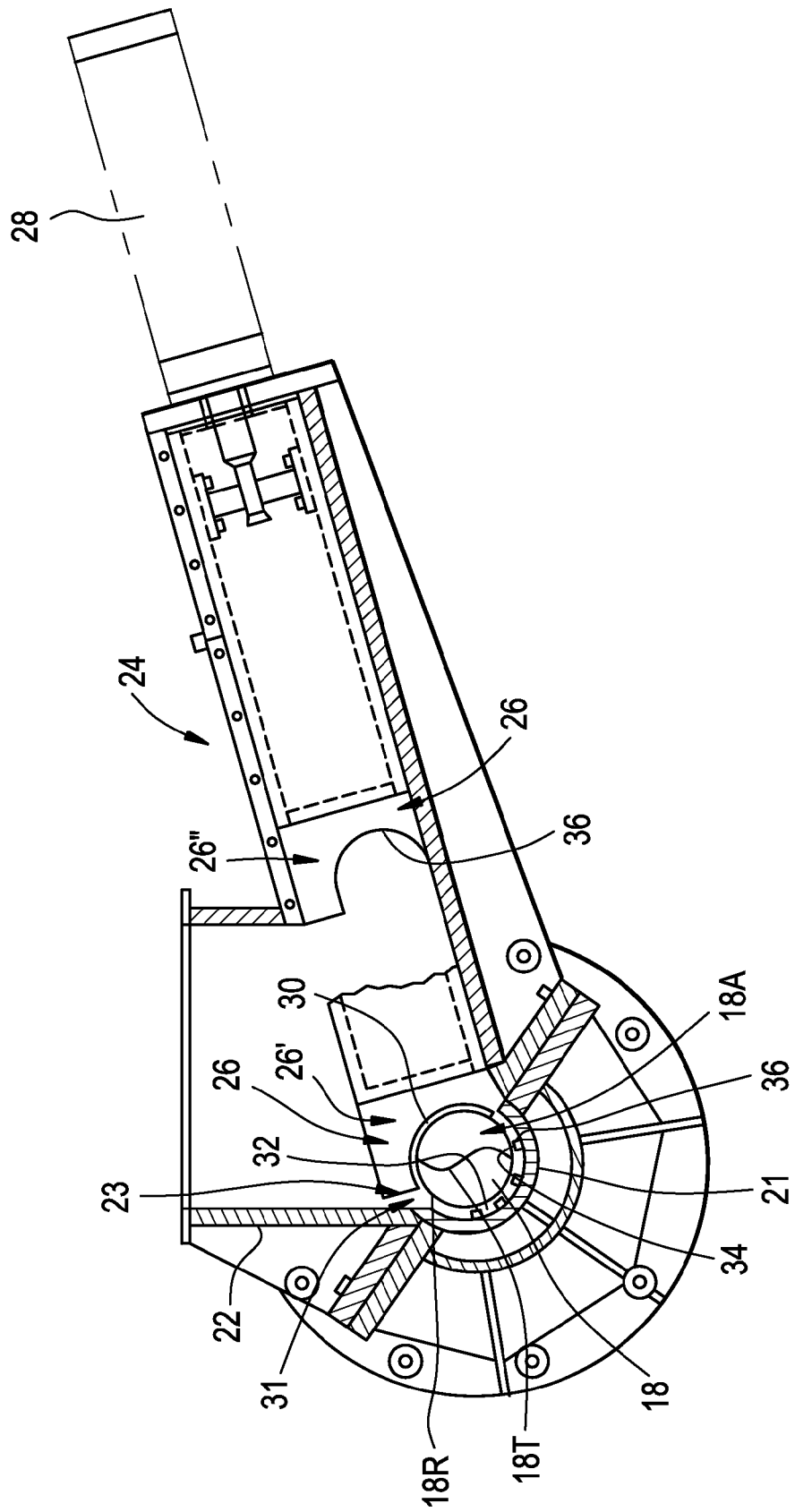
FIG. 3 is a cross sectional view of the feed throat, screw and ram stuffer portion of the extruder device of FIG. 1.
Figure 4:
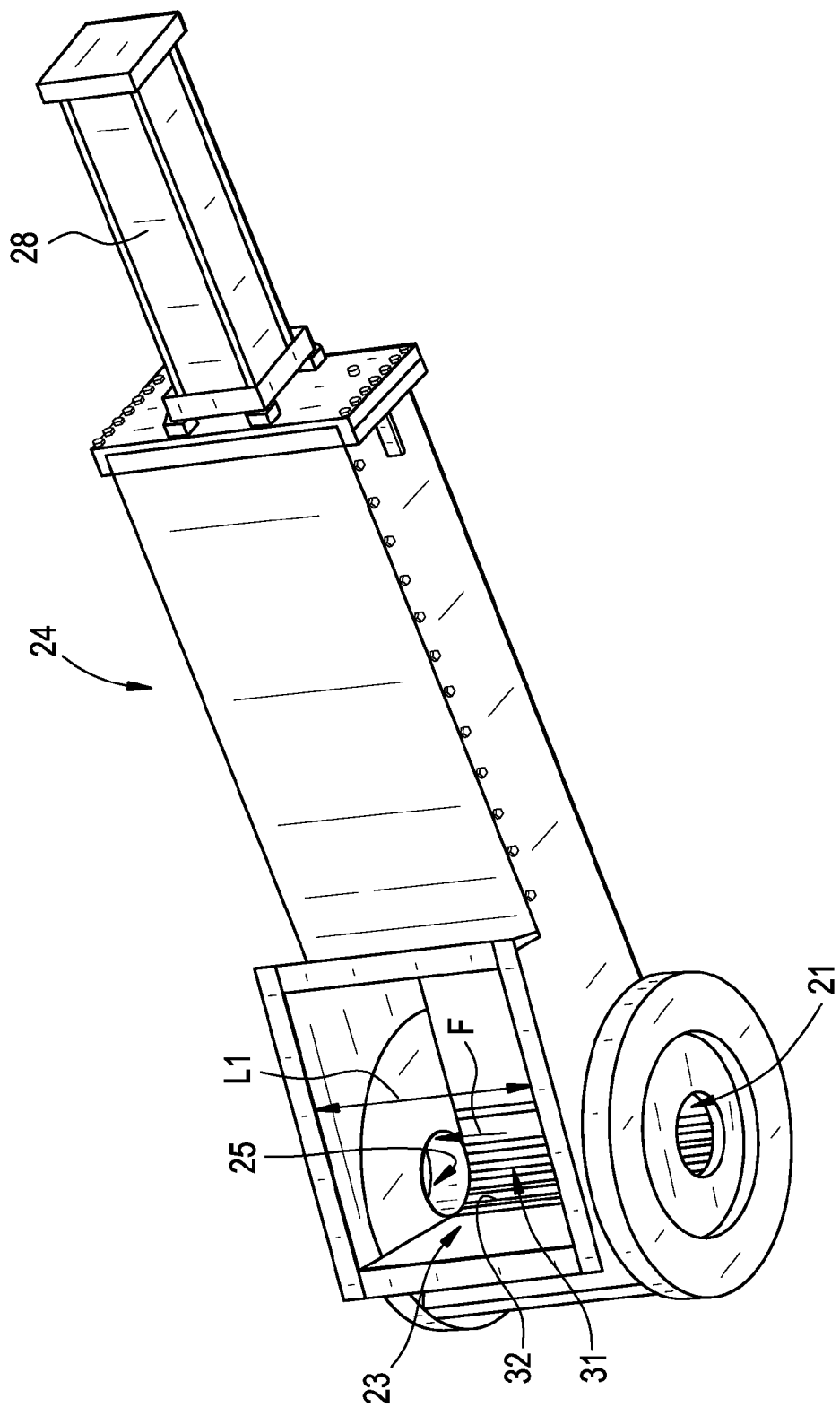
FIG. 4 is a perspective view of the feed throat, screw and ram stuffer portion of the extruder device of FIG. 1.

As shown in FIGS. 3 and 4, the feed section includes a feed throat 21 that is a substantially cylindrical body having an inlet opening 23 formed therein, for example by removal of an arcuate section of the cylindrical body. Now referring to FIGS. 4 and 5, the inlet opening 23 extends along a longitudinal length L1 of the feed throat 21 and radially from point A to point B of the feed throat. Opposing ends of the feed throat 21 are defined by a first annular ring 21A and a second annular ring 21B. The feed throat 21 includes a substantially circular outlet 25 defined by an opening through the first annular ring 21A, adjacent to the extrusion section 16. The screw 18 extends through and is spaced apart from the first annular ring 21A and the second annular ring 21B.

Referring back to FIGS. 1 and 2, the feed section 14 includes a hopper 20 that is secured to a housing 22 portion of the feed section. The hopper 20 defines an interior area that houses a supply of feed particles or material to be extruded such as plastic pellets and/or plastic chunks. The interior area of the hopper 20 is in communication with the opening 23, of FIGS. 3 and 4, so that the feed particles can be fed through the feed throat 21 by the screw 18 in the general direction indicated by the arrow F, as shown in FIG. 5.

A ram stuffer 24 is secured to the housing 22. The ram stuffer 24 includes a plunger 26, as shown in FIG. 3, which oscillates between an extended position 26' and a retracted position 26". The plunger 26 is moved between the extended position 26' and the retracted position 26" by a piston/cylinder operator 28 such as a pneumatic operated piston/cylinder device. The plunger 26 includes a shovel portion 30 that has an arcuate surface that is shaped to match a substantially cylindrical envelope of a radially outermost portion 18R of the screw 18. The ram stuffer 24 is configured to densify and move the feed particles through the feed throat opening 23 and into the channels 18A of the screw 18.

Figure 5:
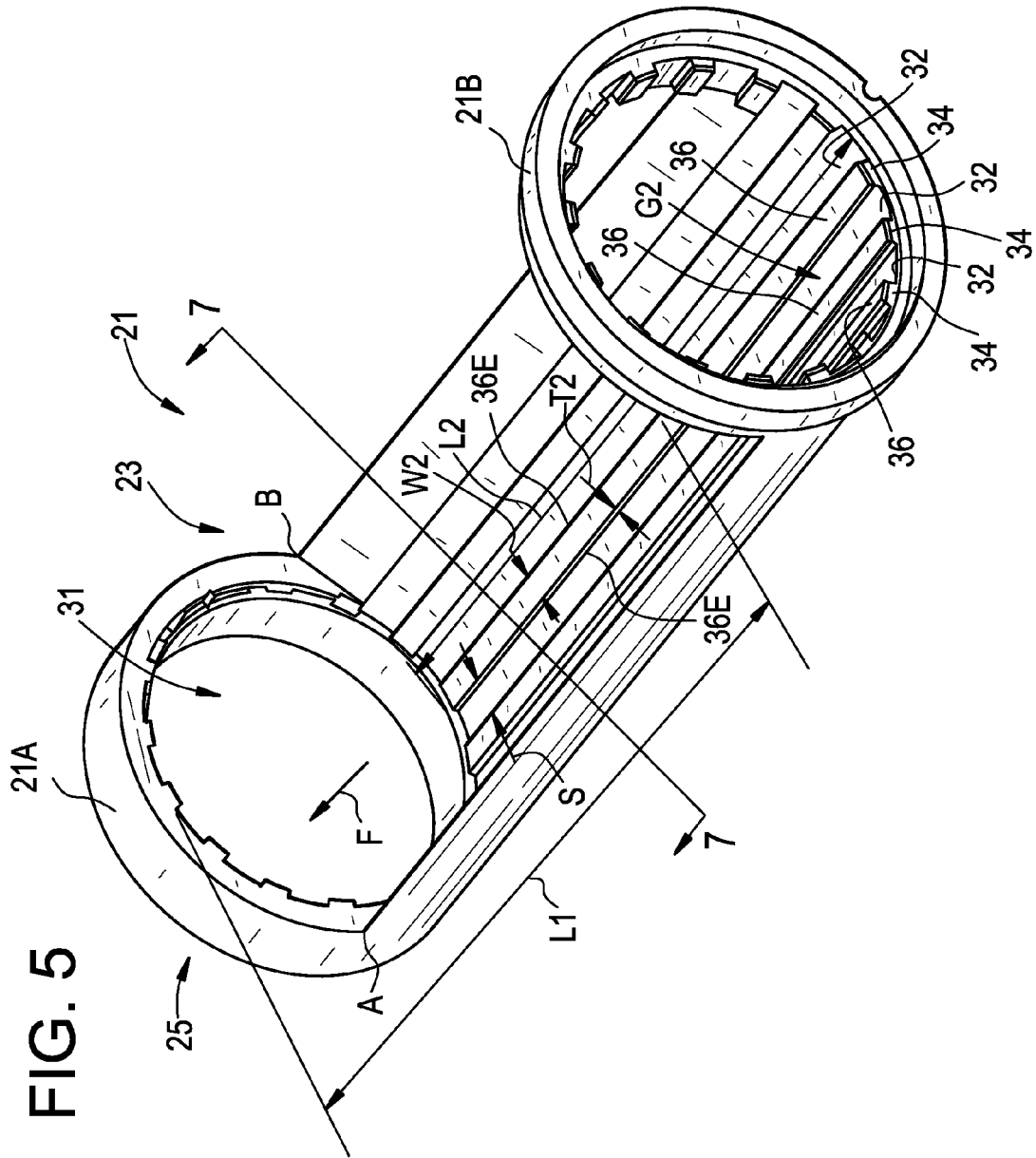
FIG. 5 is a perspective view of the feed throat of the extruder device of FIG. 1.
Figure 7:
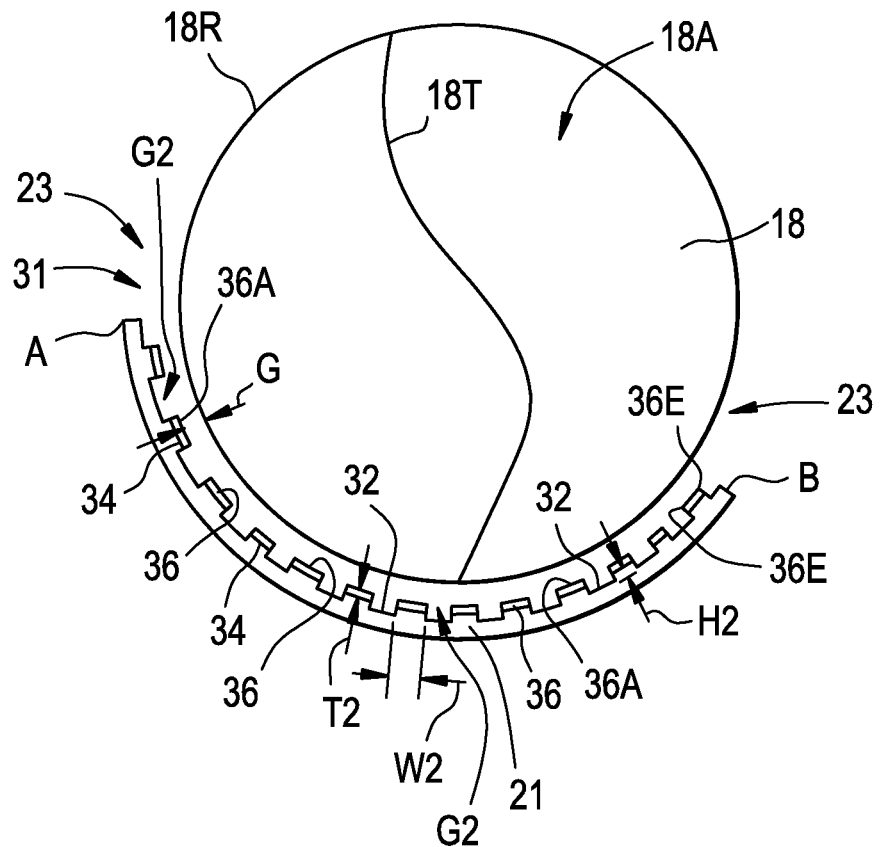
FIG. 7 is an enlarged cross sectional view of section 7:7 of the screw and feed throat section of the extruder device of FIG. 1.

As shown in FIGS. 3-5, 7, and 9, the feed throat 21 has an interior area 31 defined by an interior surface 32 of the feed throat. The interior surface 32 has a plurality of raised surfaces 34 extending radially inward from the inside surface 32 by a height H2 as shown in FIG. 7. The raised surfaces 34 extend longitudinally along the inside surface 32 and define a groove G2 between adjacent raised surfaces. The raised surfaces 34 are spaced apart from one another by a distance S, as shown in FIG. 5. In one embodiment, the spacing S between raised surfaces 34 is about equal for all of the raised surfaces. In one embodiment, the spacings S between adjacent raised surfaces 34 are not equal. Each of the plurality of raised surfaces 34 has a hardened tile 36 secured thereto. In one embodiment, the hardened tiles 36 are manufactured from tungsten carbide. In one embodiment, the hardened tiles 36 are secured to each of the plurality of raised surfaces 32 by brazing. In one embodiment, the hardened tiles 36 are cemented to each of the plurality of raised surfaces 32 using a suitable adhesive.

Figure 8:
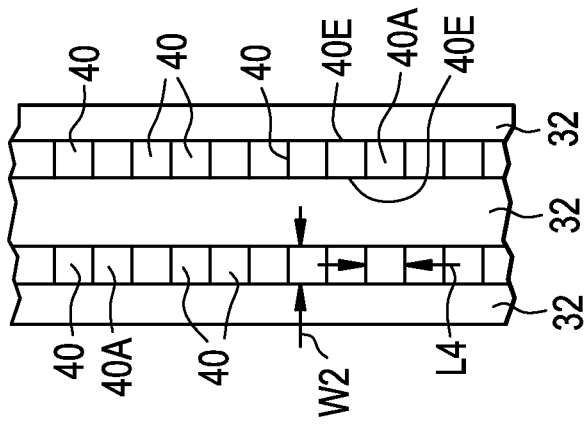
FIG. 8 is a top view of a portion of an interior surface of the feed throat of the extruder of FIGS. 1-5.

As illustrated in FIGS. 4, 5, and 8, each of the tiles 36 is a unitary piece covering substantially all of one of the respective raised surfaces 34 and having a length L2, a width W2 and a thickness T2. As shown in FIG. 7 the thickness T2 is of a predetermined magnitude to optimize the magnitude of a gap G between an exposed face 36A of the tile 36 and the radially outermost portion 18R of the screw 18. For example, the magnitude of the gap G is determined to prevent the feed particles from rotating with the screw 18 and to promote forward displacement of the feed particles out of the feed throat 21 and into the extrusion section 16. Each of the tiles 36 have sharp edges 36E formed on opposing ends of the exposed faces 36A. The sharp edges 36E also help prevent the feed particles from rotating with the screw 18 and promote forward displacement of the feed particles out of the feed throat 21 and into the extrusion section 16.

Figure 7A:
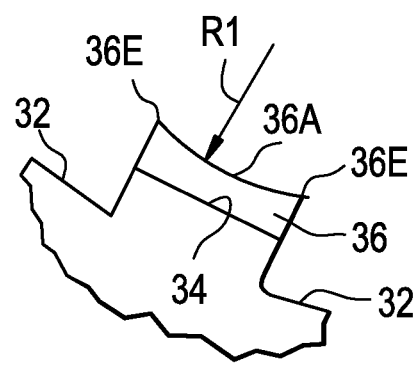
FIG. 7A is an enlarged cross sectional view of one embodiment of one of the tiles of the feed throat of FIG. 7.

In one embodiment, as shown in FIG. 7A, the tile 36 has an attachment edge 35 which is affixed to the raised surface 34, for example, by brazing. As illustrated in FIG. 7A, in one embodiment, the exposed surface 36A of the tile 36 has an arcuate contour defined by a radius R1. The radius R1 is predetermined to define a contour of the exposed surface 36A that is complementary to the radially outermost portion 18R of the screw 18. As shown in FIG. 7A, the raised surface 34 extends radially inward from the inside surface 32 by a height H2. The tile 36 has a thickness T.

Figure 7B:
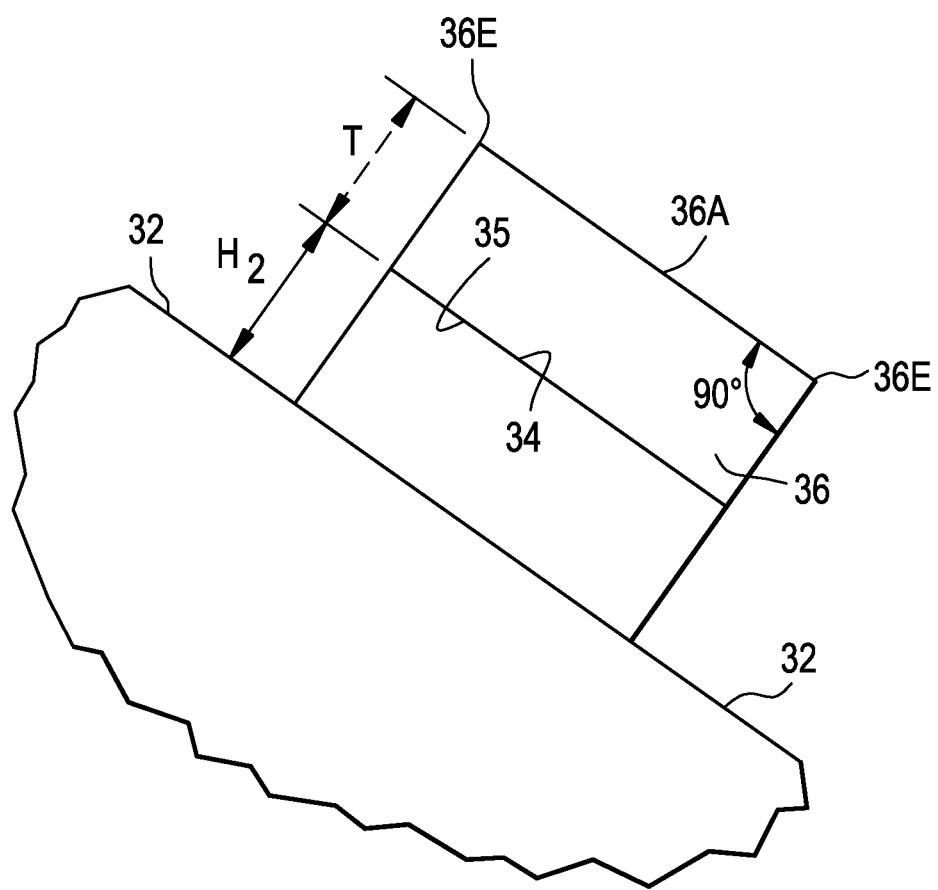
FIG. 7B is an enlarged cross sectional view of one embodiment of one of the tiles of the feed throat of FIG. 7.

In one embodiment, as shown in FIG. 7B, the sharp edges 36E meet the exposed face 36A of the tile 36 at substantially a right angle. As illustrated in FIG. 7B, the exposed surface 36A is substantially flat.

Figure 7C:
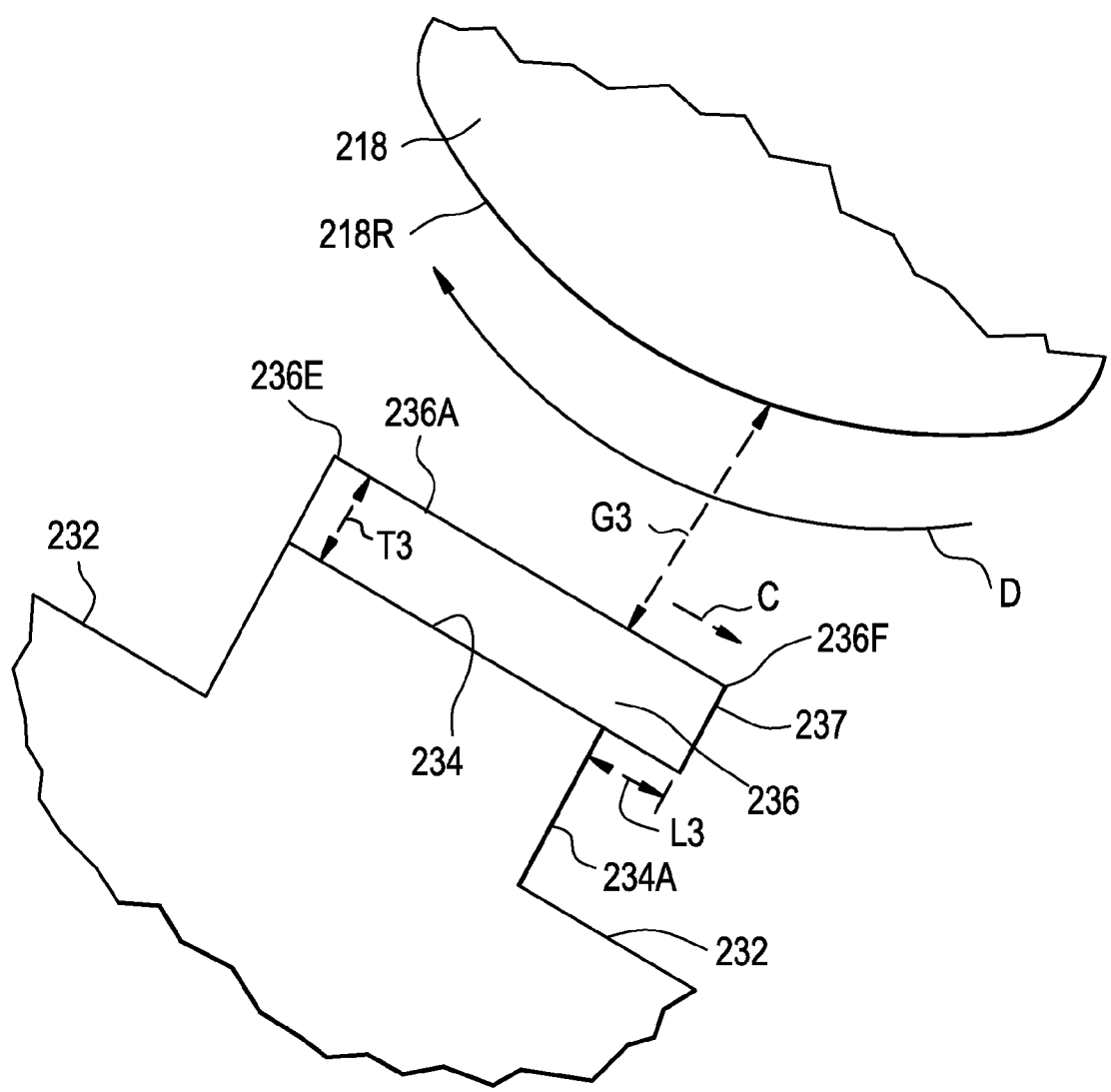
FIG. 7C is an enlarged cross sectional view of one embodiment of one of the tiles of the feed throat of FIG. 7 showing an extended tile.

In another embodiment, as shown in FIG. 7C, a tile 236 is wider than a raised surface 234. The tile 236 defines an end 237, which extends the length of the raised surface 234 and overhangs on one side so that an edge 236F of the tile 236 extends beyond an edge 234A of the raised surface 234 by a length L3. The length L3 is of a predetermined magnitude to optimize the capture and flow of feed particles or material to be extruded such as plastic pellets and/or plastic chunks from a hopper. The end 237 overhangs in a direction indicated by an arrow C in a direction generally opposite to the direction D of the screw 218. The sharp edges 236E and 236F aid in the capture and flow of feed particles or materials to be extruded.

As shown in FIG. 7C, in one embodiment a thickness T3 of the tile 236 is of a predetermined magnitude to optimize the magnitude of a gap G3 between an exposed face 236A of the tile 236 and the radially outermost portion 218R of the screw 218. For example, the magnitude of the gap G3 is determined to prevent the feed particles from rotating with the screw 218 and to promote forward displacement of the feed particles out of the feed throat and into the extrusion section. As illustrated in FIG. 7C, in one embodiment the exposed surface 236A has substantially no contour and is substantially flat.

Figure 6:
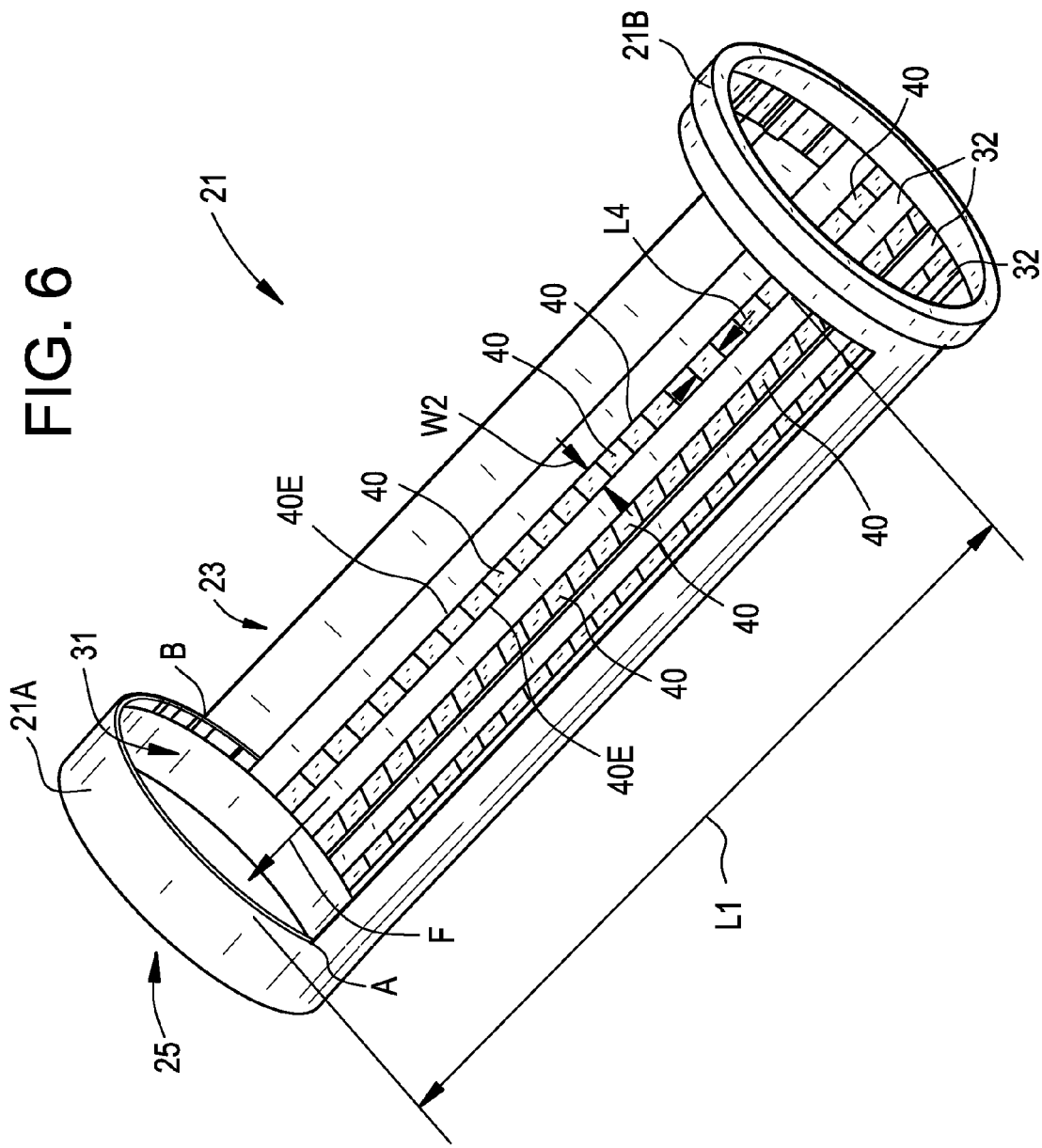
FIG. 6 is a perspective view of another embodiment of the feed throat of the extruder device of FIG. 1.
Figure 9:
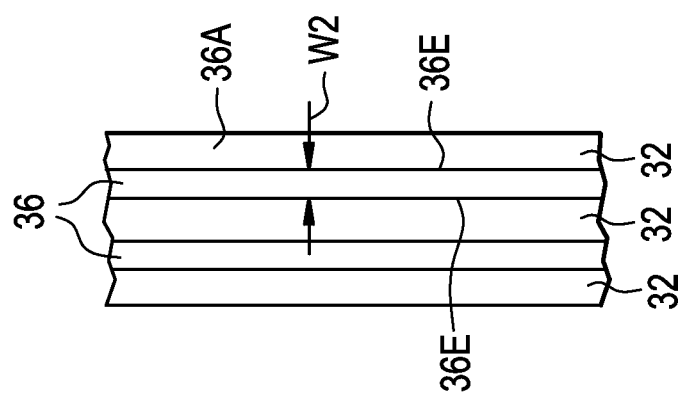
FIG. 9 is a top view of a portion of an interior surface of the feed throat of FIG. 6.

While the hardened tiles 36, 236 are shown and described as being a unitary piece covering substantially all of one of the respective raised surfaces 34, 234, the present invention is not limited in this regard as a plurality of smaller tiles 40 may be brazed or cemented to the raised surfaces 36 as illustrated in FIGS. 6 and 9. Each of the smaller tiles 40 has a width W2, a thickness T2 and a length L4. The length L4 is substantially less than the length L2. In one embodiment, the length L4 is about ⅓₀ of the length L2. The smaller tiles 40 have an exposed surface 40A. The thickness T2 is of a predetermined magnitude to optimize the magnitude of a gap G between an exposed face 40A of the smaller tile 40 and the radially outermost portion 18R of the screw 18 of FIG. 7. Each of the smaller tiles 40 have sharp edges 40E formed on opposing ends of the exposed faces 40A. The sharp edges 40E also help prevent the feed particles from rotating with the screw 18 and promote forward displacement of the feed particles out of the feed throat 21 and into the extrusion section 16.

Although the present invention has been disclosed and described with reference to certain embodiments thereof, it should be noted that other variations and modifications may be made, and it is intended that the following claims cover the variations and modifications within the true scope of the invention.

What is claimed is:

1. A feed throat for an extruder device comprising:
   a body having an inlet defined by a longitudinal opening along a side of the body and an outlet positioned at an end of the body;
   the body having a substantially cylindrical interior surface;
   the interior surface having a plurality of raised surfaces extending radially inward from and longitudinally along the interior surface; and
   at least one hardened tile secured to at least one of the raised surfaces, the at least one hardened tile having:
   a substantially flat exposed surface;
   a width greater than the raised surface; and
   the width extending beyond an edge of the raised surface on one side.

2. The feed throat of claim 1 wherein the at least one hardened tile is manufactured from a tungsten carbide material.

3. The feed throat of claim 1 wherein the at least one hardened tile is brazed to the raised surface.

4. The feed throat of claim 1 wherein the at least one hardened tile is cemented to the raised surface.

5. The feed throat of claim 1 wherein the at least one hardened tile has an arcuate exposed surface.

6. An extruder device comprising:
   a drive section and an extrusion section with a feed section disposed therebetween;
   the feed section having a feed throat comprising
   a body having an inlet defined by a longitudinal opening along a side of the body and an outlet positioned at an end of the body;
   the body having a substantially cylindrical interior surface;
   the interior surface having a plurality of raised surfaces extending radially inward from and longitudinally along the interior surface;
   at least one hardened tile secured to at least one of the raised surfaces, the at least one hardened tile having:
   a substantially flat exposed surface;
   a width greater than the raised surface; and
   the width extending beyond an edge of the raised surface on one side;
   a feed hopper and a ram stuffer coupled to the feed throat and in communication with the inlet; and
   a screw supported by at least one of the drive section and the extrusion section and extending through the feed throat, the screw being spaced apart from the at least one hardened tiles such that feed particles fed through the feed throat are prevented from rotating with the screw and so that forward displacement of the feed particles out of the feed throat and into the extrusion section is promoted.

7. The extruder device of claim 6 wherein the at least one hardened tile is manufactured from a tungsten carbide material.

8. The extruder device of claim 6 wherein the at least one hardened tile is brazed to the raised surface.

9. The extruder device of claim 6 wherein the at least one hardened tile is cemented to the raised surface.

10. The extruder device of claim 6 wherein the at least one hardened tile has an arcuate exposed surface.

* * * * *